(12) United States Patent
Megahed et al.

(10) Patent No.: US 10,726,027 B2
(45) Date of Patent: Jul. 28, 2020

(54) COGNITIVE ELASTICITY OF CLOUD APPLICATIONS

(71) Applicant: INTERNATIONAL BUSINESS MACHINES CORPORATION, Armonk, NY (US)

(72) Inventors: Aly Megahed, San Jose, CA (US); Mohamed Mohamed, San Jose, CA (US); Samir Tata, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 15/814,608

(22) Filed: Nov. 16, 2017

(65) Prior Publication Data
US 2019/0147089 A1   May 16, 2019

(51) Int. Cl.
G06F 16/2458   (2019.01)
H04L 29/08   (2006.01)
(Continued)

(52) U.S. Cl.
CPC ........ *G06F 16/2462* (2019.01); *G06F 9/5005* (2013.01); *G06F 16/217* (2019.01);
(Continued)

(58) Field of Classification Search
None
See application file for complete search history.

(56) References Cited

U.S. PATENT DOCUMENTS 9,274,848 B2   3/2016   Dawson et al.
9,419,913 B2*  8/2016   Ferris ................... G06F 9/5072
(Continued)

FOREIGN PATENT DOCUMENTS

WO   2016113747 A1   7/2016
WO   2016195716 A1   12/2016

OTHER PUBLICATIONS

CloudMonix, "CloudMonix is replacing AzureWatch", New depth in Azure monitoring and management., CloudMonix Azure Watch Azure monitoring automation auto-scaling, http://www.cloudmonix.com/aw/, pp. 1-2.
(Continued)

*Primary Examiner* — Hung D Le
(74) *Attorney, Agent, or Firm* — Kristofer L. Haggerty

(57) ABSTRACT

A computing device retrieves historical data regarding one or more historical time periods during which cloud application instances were provisioned. A probability distribution of a number of queries received by the historical cloud application instances during each of the one or more historical time periods is determined by the computing device. A probability distribution of a number of received queries completed by each of the one or more historical cloud application instances during each of the one or more historical time periods is determined by the computing device. A new provisioning plan for further time periods is generated via application of a stochastic optimization model based upon the probability distribution of the number of received queries during each of the one or more historical time periods and the probability distribution of the number of received queries completed by each of the one or more cloud application instances.

20 Claims, 8 Drawing Sheets

(51) Int. Cl.
  *H04L 12/24* (2006.01)
  *G06F 9/50* (2006.01)
  *G06F 16/21* (2019.01)

(52) U.S. Cl.
  CPC ...... *G06F 16/2477* (2019.01); *H04L 41/0859* (2013.01); *H04L 67/34* (2013.01)

(56) References Cited

U.S. PATENT DOCUMENTS

| | | | | |
|---|---|---|---|---|
| 2004/0010582 | A1* | 1/2004 | Oliver | H04M 3/493 709/224 |
| 2009/0248693 | A1* | 10/2009 | Sagar | G06F 16/00 |
| 2010/0250746 | A1* | 9/2010 | Murase | G06F 9/50 709/226 |
| 2013/0031224 | A1* | 1/2013 | Nachtrab | G06F 9/5072 709/220 |
| 2013/0055258 | A1* | 2/2013 | De | G06F 8/63 718/1 |
| 2013/0139152 | A1* | 5/2013 | Chang | G06F 9/45545 718/1 |
| 2014/0075032 | A1* | 3/2014 | Vasudevan | H04L 41/50 709/226 |
| 2014/0075239 | A1* | 3/2014 | Prathipati | H04L 29/14 714/4.1 |
| 2014/0089495 | A1* | 3/2014 | Akolkar | H04L 41/147 709/224 |
| 2015/0006711 | A1* | 1/2015 | Schaad | H04L 67/1097 709/224 |
| 2016/0379125 | A1 | 12/2016 | Bordawekar et al. | |
| 2017/0024299 | A1* | 1/2017 | Deng | G06F 11/3414 |
| 2017/0063615 | A1* | 3/2017 | Yang | H04L 41/5054 |
| 2017/0075709 | A1* | 3/2017 | Feng | H04L 67/1097 |
| 2018/0097744 | A1* | 4/2018 | Hu | G06N 20/00 |

OTHER PUBLICATIONS

Gong et al., "Press: PRedictive Elastic ReSource Scaling for cloud systems", 2010, IEEE, pp. 9-16.

Roy et al., "Efficient Autoscaling in the Cloud using Predictive Models for Workload Forecasting", 2011 IEEE 4th International Conference on Cloud Computing, IEEE Computer Society, pp. 500-507.

Kuperberg et al., "Defining and Quantifying Elasticity of Resources in Cloud Computing and Scalable Platforms", https://publikationen.bibliothek.kit.edu/1000023476, 2011, p. 1 of 1.

Mell et al., "The NIST Definition of Cloud Computing", National Institute of Standards and Technology, Special Publication 800-145, Sep. 2011, pp. 1-7.

Mohamed et al., "An Autonomic Approach to Manage Elasticity of Business Processes in the Cloud", Future Generation Computer Systems 50 (2015), journal homepage: www.elsevier.com/locate/fgcs,pp. 49-61.

Schulte et al., "Introducing the Vienna Platform for Elastic Processes", A. Ghose et al. (Eds.): ICSOC 2012, LNCS 7759, 2013, pp. 179-190.

Hoenisch et al., "Self-Adaptive Resource Allocation for Elastic Process Execution", 2013 IEEE Sixth International Conference on Cloud Computing, pp. 220-227.

Hoenisch et al., "Workflow Scheduling and Resource Allocation for Cloud-based Execution of Elastic Processes", 2013 IEEE 6th International Conference on Service-Oriented Computing and Applications, pp. 1-8.

Tsai et al., "Two-Tier Multi-Tenancy Scaling and Load Balancing", IEEE International Conference on E-Business Engineering, 2010, pp. 484-489.

Kranas et al., "ElaaS: An innovative Elasticity as a Service framework for dynamic management across the cloud stack layers", 2012 Sixth International Conference on Complex, Intelligent, and Software Intensive Systems, 2012 IEEE Computer Society, pp. 1042-1049.

Le et al., "On Elasticity and Constrainedness of Business Services Provisioning", 2012 IEEE Ninth International Conference on Services Computing, IEEE Computer Society, pp. 384-391.

Klai et al., "Formal Modeling of Elastic Service-based Business Processes", 2013 IEEE 10th International Conference on Services Computing, pp. 424-431.

Tan et al., "An Adaptive Learning Approach for Efficient Resource Provisioning in Cloud Services", Performance Evaluation Review, vol. 42, No. 4, Mar. 2015, pp. 3-11.

Sedaghat et al., "A Virtual Machine Re-packing Approach to the Horizontal vs. Vertical Elasticity Trade-off for Cloud Autoscaling", CAC'13, Aug. 5-9, 2013, Copyright 2013 ACM, pp. 1-10.

Grace Period Disclosure, Megahed et al., "A Stochastic Optimization Approach for Cloud Elasticity", Announcement 2017 IEEE 10th International Conference on Cloud Computing, Jun. 25-30, 2017, pp. 456-463, (including pages of content).

Grace Period Disclosure, Cloud 2017, IEEE, 2017 IEEE 10th International Conference on Cloud Computing, Jun. 25-30, 2017, pp. 1-12.

\* cited by examiner

COGNITIVE ELASTICITY OF CLOUD APPLICATIONS

STATEMENT REGARDING PRIOR DISCLOSURES BY THE INVENTOR OR A JOINT INVENTOR

Aspects of the present invention may have been disclosed by the inventors in the article, "A Stochastic Optimization Approach for Cloud Elasticity," made available to the public on or after Jun. 25, 2017 at the 2017 IEEE 10th International Conference on Cloud Computing. These aspects, as they may appear in the claims, may be subject to consideration under 35 U.S.C. § 102(b)(1)(A).

BACKGROUND

The present invention relates generally to the field of cloud computing, and more particularly to provisioner optimization in provisioning and deprovisioning of cloud application instances.

BRIEF SUMMARY

Embodiments of the present invention disclose a method, system, and computer program product for provisioning and deprovisioning cloud application instances. A computing device retrieves historical data regarding one or more historical time periods during which a plurality of cloud application instances were provisioned. The computing device determines a probability distribution of a number of queries received by the historical cloud application instances during each of the one or more historical time periods. The computing device determines from the historical data a probability distribution of a number of received queries completed by each of the one or more historical cloud application instances during each of the one or more historical time periods. The computing device generates a new provisioning plan for future time periods via application of a stochastic optimization module based upon the probability distribution of the number of received queries during each of the one or more historical time periods and the probability distribution of the number of received queries completed by each of the one or more cloud application instances.

DETAILED DESCRIPTION

Deployment mechanisms for deployment of applications, databases, services, etc. in cloud environments (collectively, "cloud application instances") are increasingly attractive to developers that find them convenient in deploying applications. Rapid elasticity is a necessary element in coping with the dynamic nature of cloud environments, allowing replicating or removing cloud application instances to deal with changing numbers of incoming queries in a rapid fashion. Determining the number of cloud application instances needed at a given time may be challenging, given that a number of received queries during a time frame is variable, as is the number of queries fulfilled by a single cloud application instance.

In situations where a large amount of variability in the number of queries arriving for the applications, databases, etc. deployed in cloud application instances occurs during a very short period of time, such as during a sporting event or during airing of the final episode of a popular show, the number of incoming queries may change dramatically in a short period of time. After a play in the sporting event or when a significant plot development happens in the final episode, additional cloud application instances may be necessary to respond to queries regarding the sporting event or the episode, at least temporarily, to support load while maintaining quality of service, while the cloud application instances are unnecessary a short time later such as because the sporting event or the final episode ends. Since any cloud application instance requires commitment of cloud computing resources including memory, processor time, a tradeoff exists between deploying too many cloud application instances, thus leading to unnecessarily committing resources, versus deploying too few cloud application instances, and not being able to service all received queries in a timely fashion. A need exists, therefore, for an effective manner of determining a number of cloud application instances provisioned at any one time in cloud environments, the number of cloud application instances presenting a balance between having enough cloud application instances executing in a cloud environment to service incoming queries in a timely manner without having so many cloud application instances to unnecessarily devote processor time, memory, secondary storage, etc. to hosting cloud application instances which are not utilized or underutilized. Presented is a method, system, and computer program product to efficiently determine the number of cloud application instances to be deployed to service queries in a timely manner.

"Queries" (or "querying") as used herein refers to any attempt by a user, application, program, daemon, etc. to access applications, databases, services, etc. deployed and hosted in cloud environments (collectively, "cloud application instances").

Figure 1:
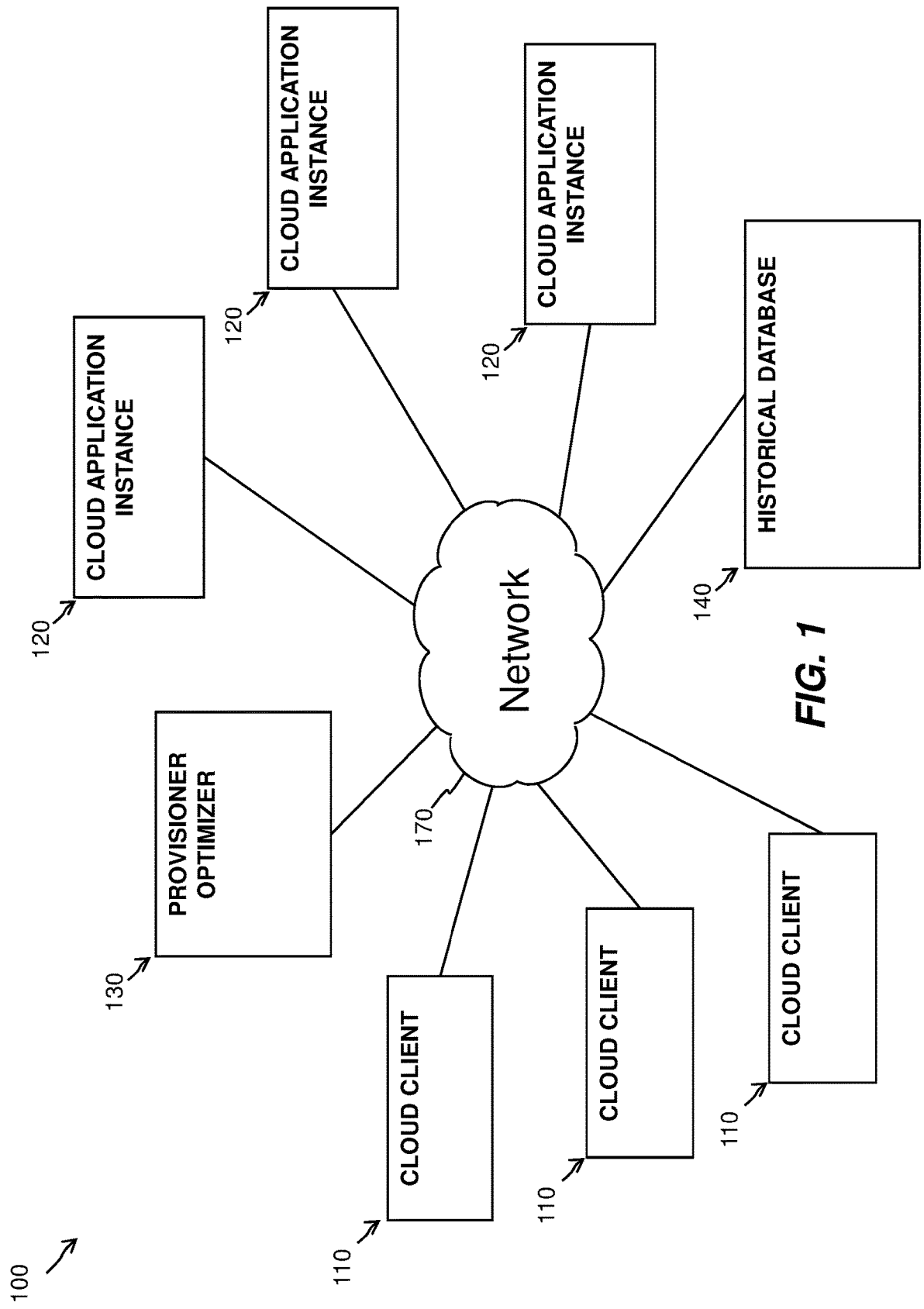
FIG. 1 is a functional block diagram illustrating an environment for provisioner optimization in provision of cloud applications instances, in accordance with an embodiment of the present invention.

FIG. 1 is a functional block diagram illustrating an environment 100 for provisioner optimization in provision of cloud applications in accordance with an embodiment of the present invention. In an exemplary embodiment, included in the environment 100 are one or more cloud clients 110 submitting queries to cloud application instances 120 to access applications, databases, services, etc. deployed as such. The one or more cloud clients 110 may, by means of non-limiting example, submit queries to a sports website deployed in cloud application instances 120 regarding the real-time score of a sporting event, submit queries to a video-on-demand service deployed in cloud application instances 120, or submit queries to buy newly released tickets from a ticket sales company deployed in cloud application instances 120. Three cloud clients 110 are displayed, but millions may be present a short time later, all submitting queries to cloud application instances 120. In the example above, because of the re-review of a play during commercial time, recent release of a show, or new public availability of tickets, the number of cloud clients 110 submitting queries may increase dramatically in a very short time. As the number of queries submitted to cloud application instances 120 changes due to load increasing by additional cloud clients 110 logging-on or cloud clients 110 submitting more queries, additional cloud application instances 120 are replicated and provisioned by provisioner optimizer 130 to support the current load (or deprovisioned and removed from environment 100, as appropriate, if load decreases), while attempting to maintain quality of service by not having excessive wait times or failed queries. In an exemplary embodiment, provisioner optimizer 130 utilizes data provided by historical database 140 to optimize the number of cloud application instances provisioned or deprovisioned in environment 100, in a cognitive fashion as described below.

Each of cloud client 110, cloud application instance 120, provisioner optimizer 130, and historical database 140 may include internal and external hardware components as depicted and described in further detail below with reference to FIG. 4, below. In the exemplary embodiment, each of cloud computing cloud client 110, cloud application instance 120, provisioner optimizer 130, and historical database 140 are implemented in a cloud computing environment, as described in relation to FIGS. 5 and 6 below. Provisioner optimizer 130 and historical database 140 may be implemented in management layer 80, as discussed in connection with FIG. 6, including any or all of resource provisioning 81, service level management 84, and service level agreement planning and fulfillment 85. Cloud client 110 and/or cloud application instances 120 may be implemented in workload layer 90 of FIG. 6.

Figure 2:
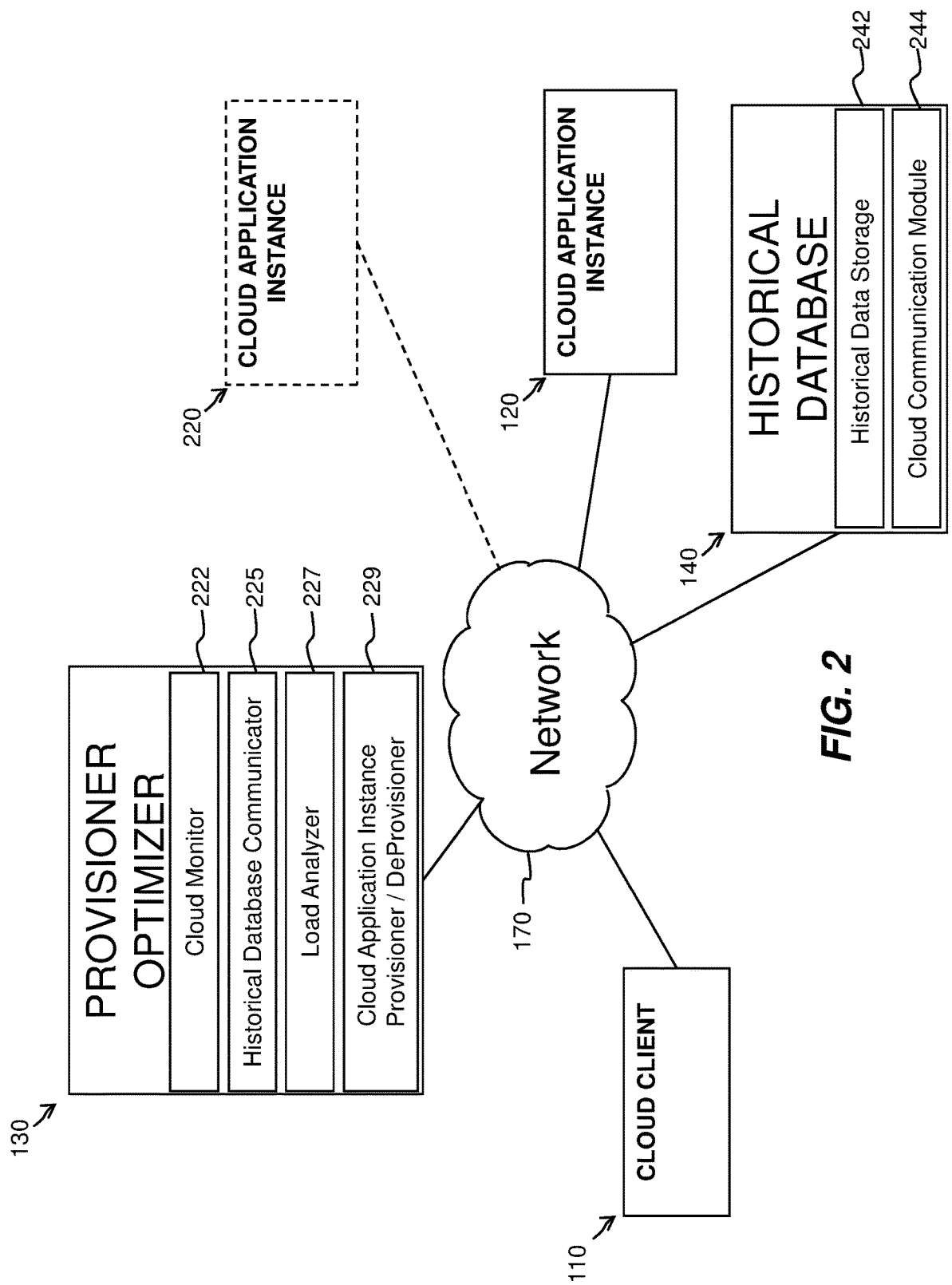
FIG. 2 is a functional block diagram illustrating components necessary to provision a new cloud application instance utilizing data from the historical database, in accordance with an embodiment of the present invention

FIG. 2 is a functional block diagram illustrating components necessary to provision a new cloud application instance 220 utilizing data from the historical database 140, in accordance with an embodiment of the present invention. One cloud application instance 120 is displayed as currently executing, although more may also be executing. One cloud client 110 is displayed in FIG. 2, although many may be concurrently submitting queries through network 170. The provisioner optimizer 130 contains a cloud monitor 222, a historical database communicator 225, a load analyzer 227, and a cloud application instance provisioner/deprovisioner 229. The cloud monitor 222 continuously or periodically determines whether a new provisioning plan is necessary for the environment 100. Since each cloud tenant is accorded a certain level of quality of service in the cloud tenant's quality of service agreement, by cloud client 110 expectations, and/or other reasons cloud monitor 222 ascertains whether the current provisioning plan is adequate to provide adequate quality of service or whether a new provisioning plan is necessary.

In circumstances when the cloud monitor 222 periodically determines whether a new provisioning plan is necessary, the determination of whether quality of service in accord with a quality of service agreement is being provided by to may occur on an hourly basis, a daily basis, a weekly basis, or a monthly basis. In circumstances where the cloud monitor 222 continuously determines whether a new provisioning plan is necessary, the cloud monitor 222 receives data regarding the load balance status of cloud application instance(s) 120 in various ways to determine the number of cloud application instances to be deployed to service queries in a timely manner, such as in accord with a quality of service agreement with the cloud tenant. The cloud monitor 222 may utilize indicators in application code executing across network 170 which are continuously monitored by the cloud monitor 222, the indicators related to a number of parallel invocations of cloud application instance 120 which are executing, as well as a time duration to service queries from cloud client(s) 110, with data posted from a POST REST query to the cloud monitor 222. The cloud monitor 222 may utilize different REST APIs to collect monitoring data. A representational state transfer (REST), or RESTful web services provide communications between the internet and a computing device. The cloud monitor 222 may receive notifications regarding the load balance status through a specific interface following a publish/subscribe paradigm available in REST. The cloud monitor 222 may utilize an internal or external database to save this collected information for further use. IBM® Bluemix™ may be utilized in collecting the relevant data.

If a new provisioning plan is necessary, the historical database communicator 225 retrieves historical data regarding one or more historical time periods during which one or more cloud application instances 120 were provisioned. Each time period herein is defined as T, and a cardinality of that set is defined as |T|. Queries from cloud client(s) 110 are received by each cloud application instance 120 during each historical time period. It is assumed each cloud application instance 120 receives a variable number of queries at each historical time period. The number of queries received is uncertain, and variable $\Omega$ denotes a vector of uncertainty, and $\omega$ denotes a given realization of uncertain parameters. A number of variable queries received at time period $t \in T$ for scenario $\omega \in \Omega$ is designated as $qd_t(\omega)$.

The historical data in the historical database 140 contains data regarding a number of queries that were fulfilled by each single cloud application instance 120 is defined as $cq(\omega)$ for scenario $\omega \in \Omega$, for each of the historical time periods. Therefore, $\Omega = (QD, CQ)$. It may be assumed that the number of queries that can be fulfilled by any single cloud application instance 120 is variable, but the historical data such as contained in historical database 140 is based upon the actual queries that were completed by each cloud application instance 120 executing.

This historical data is obtained via the historical database communicator 225 from the historical database 140. The historical database 140 maintains such data in historical database storage 242, and responds via the cloud communication module 244 with the historical data. The historical time periods may each be ten minutes in duration, thirty minutes in duration, one hour in duration, five hours in duration, ten hours in duration, or any other period. All of the historical time periods may cover in sum one week, one month, six months, one year, or any other period.

Load analyzer 227 is generally responsible for analyzing the historical data to determine distributions of incoming queries and behavior of cloud application instances 120 as further described herein. The load analyzer 227 of provisioner optimizer 130 may determine from the historical data retrieved from the historical database communicator 225 a number of historical cloud application instances 120 that were executing during each of the one or more historical time periods.

The load analyzer 227 further determines a probability distribution of a number of received queries arriving during each of the one or more historical time periods (or, in other embodiments, determines the number of received queries during each of the one or more historical time periods). A datestamp and/or a timestamp of each received query received by each cloud application instance 120 may be utilized by the load analyzer 227 in determining the number of received queries arriving during each of the one or more historical time periods.

The load analyzer 227 further determines from the historical data a probability distribution of a number of received queries received by each of the one or more cloud application instances 120 that were completed during each of the one or more historical time periods. In other embodiments, the load analyzer 227 determines a number of received queries received by each of the one or more cloud application instances 120 that were completed during each of the one or more historical time periods.

The load analyzer 227 may further determine or access a cost for under-provisioning cloud application instances 120 if there are too many queries from cloud clients 110 for the existing cloud application instances 120 to service, a cost for over-provisioning (e.g., cost of underutilized resources or devoting processor time, memory, secondary storage, to hosting cloud application instances 120 which are not utilized), and constraints related to provisioning cloud application instances (such as, for example, a maximum number of provisioned cloud application instances during each historical or future time period, defined as maxi or a cost associated with initial deployment of each cloud application instance 120, defined as $c_t$). Some or all of this data may be further used as described above and below.

The load analyzer 227 generates a new provisioning plan for future time periods via application of a stochastic optimization model based upon the probability distribution of the number of received queries during each of the one or more historical time periods and the probability distribution of the number of received queries completed by each of the one or more cloud application instances. The new provisioning plan accounts for a variable number of queries received by each of the historical cloud application instances during each of the one or more historical time periods, a variable number of queries satisfied by each of the one or more historical cloud application instances during each of the one or more historical time periods, and for future time periods indicates an number of cloud application instances 120 to be provisioned or deprovisioned for each future time period. Each future time period may be ten minutes in duration, thirty minutes in duration, one hour in duration, five hours in duration, ten hours in duration, or any other period. All of the future time periods in sum may cover one week, one month, six months, one year, or any other period. The load analyzer 227 may also, in addition to the calculations above, further base the stochastic optimization model based upon the number of historical cloud application instances executing during the one or more historical time periods. The new provisioning plan generated by the load analyzer 227 may be calculated individually for each future time period, calculated for groups of future time periods, calculated for use until the cloud monitor 222 determines a new provisioning plan is necessary, or otherwise, as further discussed herein.

Alternately, the load analyzer 227 generates a new provisioning plan for future time periods via application of the stochastic optimization model based upon, in other embodiments, the number of cloud application instances, the number of received queries during each of the one or more historical time periods, and the number of received queries completed by each of the one or more cloud application instances 120, further basing the new provisioning plan based upon the penalty for under-provisioning, the cost of over-provisioning, and constraints related to provisioning. The alternate new provisioning plan generated by the load analyzer 227 may be calculated individually for each future time period, or as further discussed above.

When generating the new provisioning plan, in the embodiments as discussed above, the load analyzer 227 may initially generate, optionally, a probability distribution on data regarding the number of historical cloud application instances that were executing, a probability distribution of the number of queries received by the historical cloud application instances, and a probability distribution for the number of received queries completed by each of the one or more historical cloud application instances 120 during each of the historical time periods, with a mathematical fit utilized to find a best parameter for the probability distribution for the best closeness of fit. Afterwards, the closeness of fit may be estimated using a chi-squared goodness-of-fit test or an alternate.

After generating the probability distributions, the load analyzer 227 may utilize these distributions (or other data) and apply a stochastic optimization model to generate the provisioning plan. Within the stochastic model, first stage variable $X_t$ is defined as a number of cloud application instances 120 to be deployed in time period $t \in T$ Also within the stochastic model, second stage variable $UQD_t(\omega)$ and $UI_t(\omega)$ are defined as a number of queries which were not completed in time period $t \in T$ for scenario $\omega \in \Omega$, respectively. The stochastic model is formulated as following in Table 1:

TABLE 1

Sample Stochastic Optimization Model $$\min \sum_{t \in T} e_t \cdot X_t + \mathbb{E}_w[Q(X, \omega)] \quad (1)$$

$$\text{s.t. } X_t \leq \max_t, \forall t \in T \quad (2)$$
$$X_t \geq 0 \; \forall t \in T \quad (3)$$

Where $Q(X, \omega)$ is the optimal value of the following second stage problem:

$$\min \sum_{t \in T} \text{penalty}_t \cdot UQD_t(\omega) \quad (4)$$

$$\text{s.t. } qd_t(\omega) + UQD_{t-1}(\omega) + eq(\omega) \cdot UI_t(\omega) = \quad (5)$$
$$eq(\omega) \cdot X_t + UQD_t(\omega) \; \forall t \in \{2, \ldots, |T|\}$$
$$qd_t(\omega) + uqd_o + eq(\omega) \cdot UI_t(\omega) = \quad (6)$$
$$eq(\omega) \cdot X_t + UQD_t(\omega), t = 1$$
$$UQD_t(\omega) \geq 0 \; \forall t \in T \quad (7)$$
$$UI_t(\omega) \geq 0 \; \forall t \in T \quad (8)$$

Alternate calculations of stochastic models are specifically contemplated.

Variables utilized herein are defined as follows in Tables 2 and 3:

TABLE 2

Parameters (Inputs) of the Sample Stochastic Optimization Model

| | |
|---|---|
| $c_t$ | Cost of deploying any single instance at time period $t \in T$ |
| penalty$_t$ | Penalty paid for delaying the fulfillment of any single query by one period at time period $t \in T$ |

TABLE 2-continued

Parameters (Inputs) of the Sample Stochastic Optimization Model

| | |
|---|---|
| $max_t$ | Maximum number of instances that can be deployed at time period $t \in T$ |
| $cq(\omega)$ | Number of queries fulfilled by any single instance for scenario $\omega \in \Omega$ |
| $qd_t(\omega)$ | Requested number of queries (demand) at time period $t \in T$ for scenario $\omega \in \Omega$ |
| $uqd_o$ | Initial unmet demand from the previous historical periods prior to our planning horizon |

TABLE 3

Decision Variables of the Sample Stochastic Optimization Model

| | |
|---|---|
| $X_t$ | Number of instances to be deployed in time period $t \in T$ |
| $UQD_t(\omega)$ | Number of unmet query requests (demand) in time period $t \in T$ for scenario $\omega \in \Omega$ |
| $UI_t(\omega)$ | Number of un-utilized instances (resources) in period $t \in T$ for scenario $\omega \in \Omega$ |

After generation of the new provisioning plan, the cloud application instance provisioner/deprovisioner 229 provisions or deprovisions cloud application instances 120 in accordance with the new provisioning plan. The cloud application instance provisioner/deprovisioner 229 then functions in accordance with the new provisioning plan, which provisions or deprovisions cloud application instances 120 according to the new provisioning plan. The new provisioning plan may indicate, for example, that only two are necessary for an immediately proximate future time period, and therefore as displayed in FIG. 2, the cloud application instance provisioner/deprovisioner provisions one additional cloud application 220, in addition to the currently provisioned cloud application instance 120.

The cloud application instance provisioner/deprovisioner 229 may transform the new provisioning plan into CRON jobs that call a REST interface to specify a number of cloud application instances 120 to be deployed for each time period.

Figure 3A:
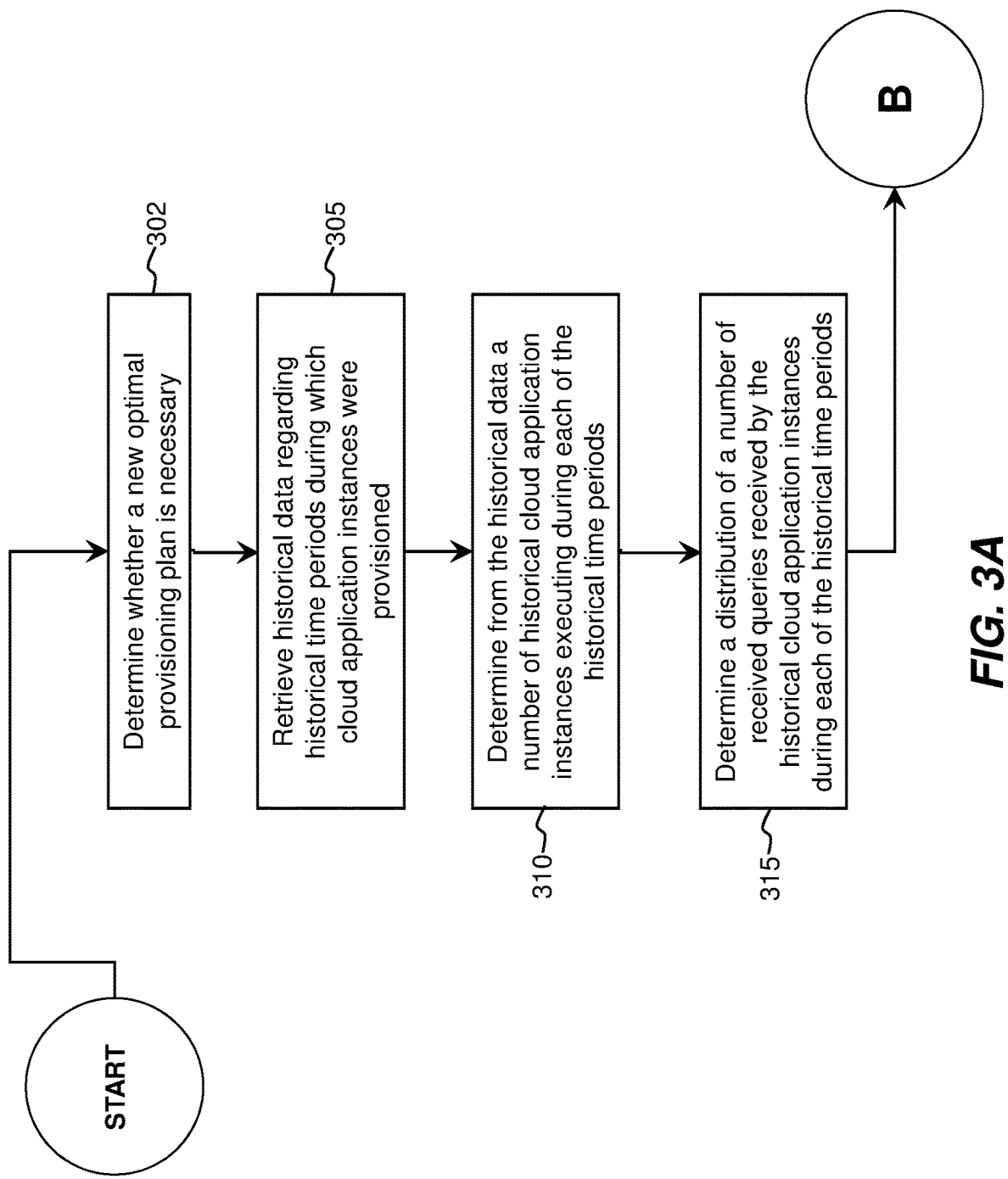
FIGS. 3A, 3B, and 3C are a flowchart depicting operational steps that a hardware component of a hardware appliance may execute, in accordance with an embodiment of the invention.
Figure 3B:
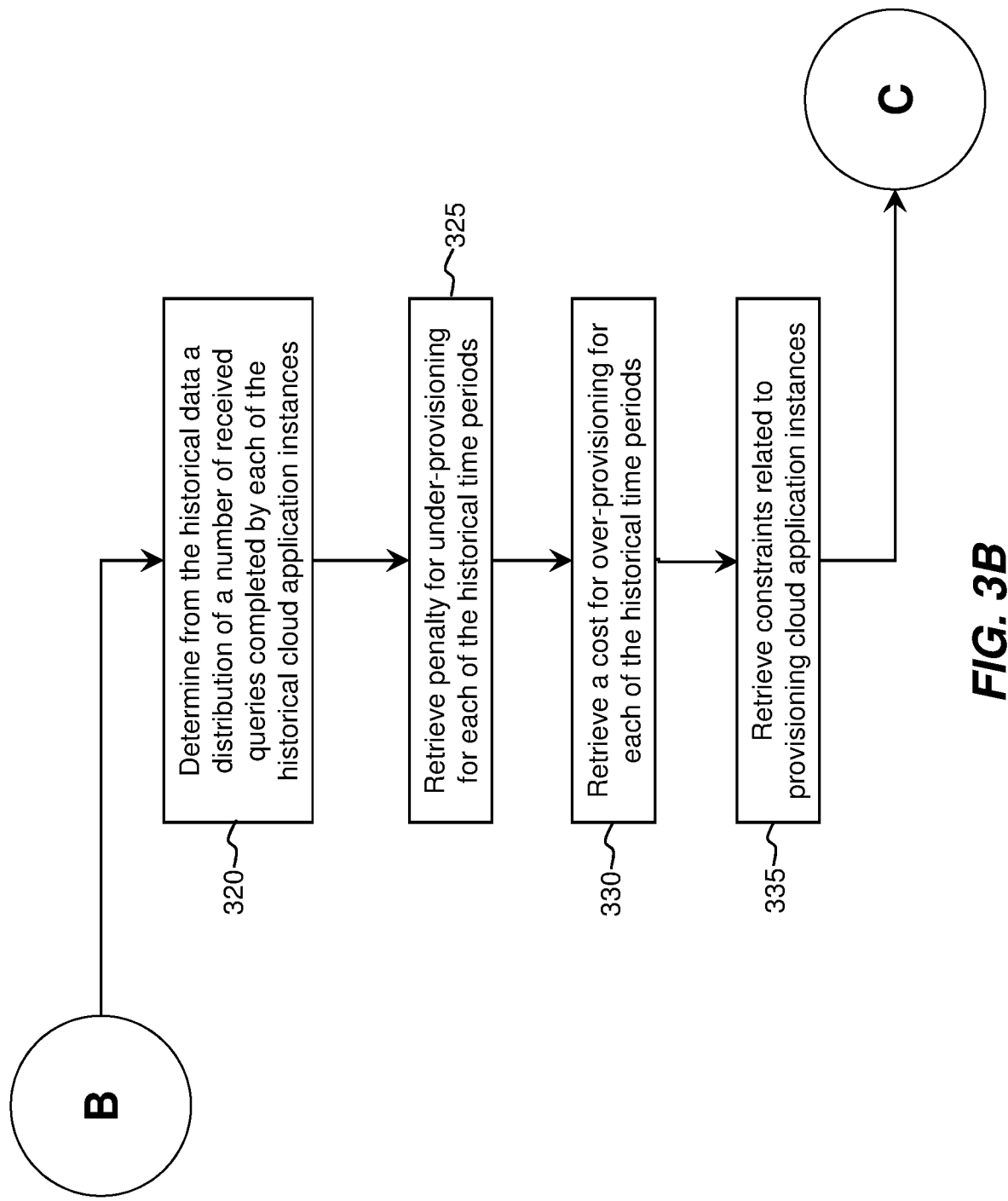
Figure 3C:
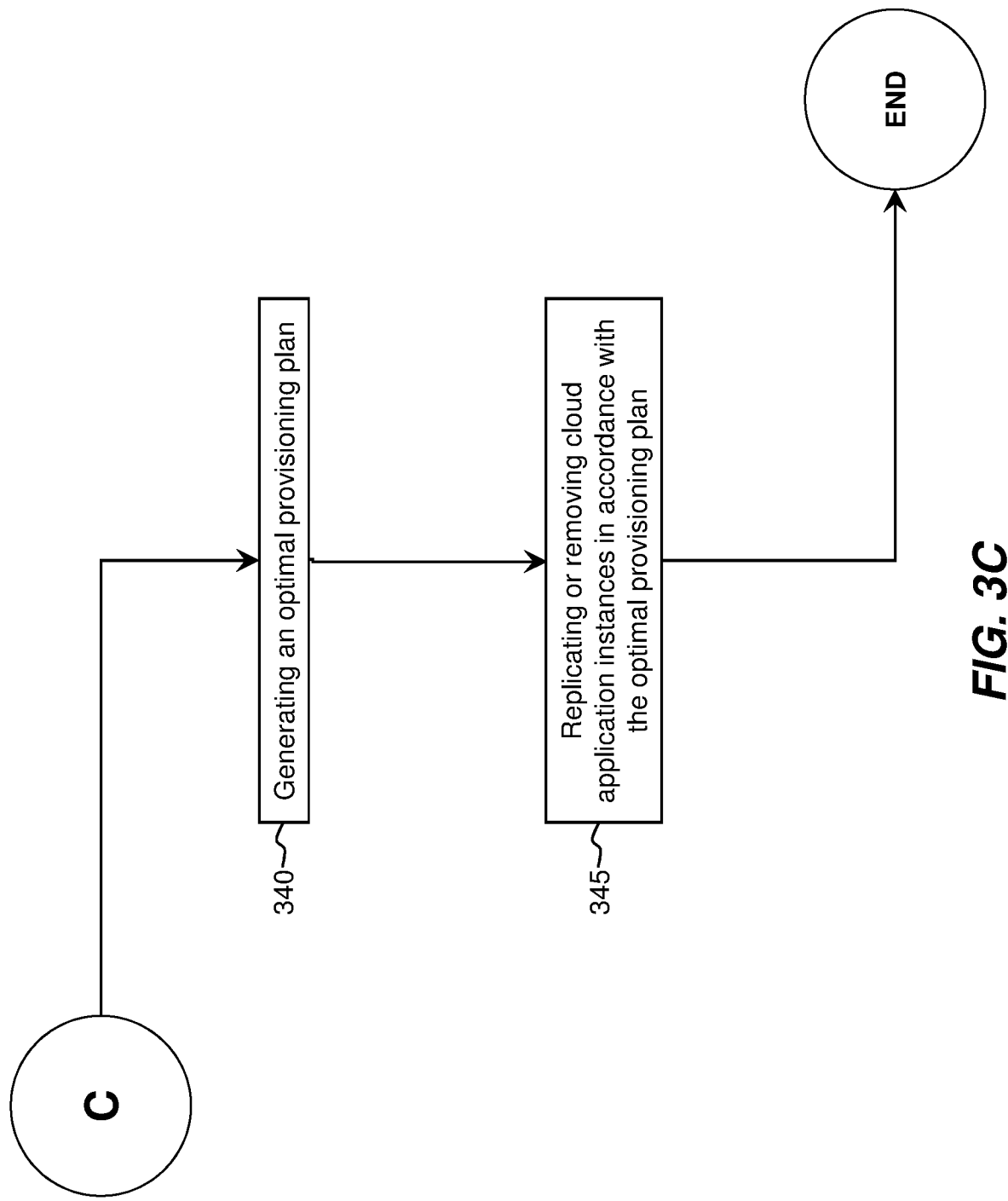

FIGS. 3A, 3B and 3C are a flowchart depicting operation steps that a hardware component, multiple hardware components, and/or a hardware appliance may execute, in accordance with an embodiment of the invention. At step 302, the cloud monitor 222 of the provisioner optimizer 130 determines whether a new provisioning plan is necessary. If it is affirmatively determined that a new provisioning plan is necessary, at step 305 the historical database communicator 225 of provisioner optimizer 130 retrieves historical data regarding historical time periods from historical database storage 242 of historical database 140. The historical data discusses periods during which one or more cloud application instances 120 were provisioned (or, alternately, then-executing). After receiving the historical data, at step 310, optionally, the load analyzer 227 determines from the historical data a number of historical cloud application instances 120 executing during each of the one or more historical time periods. At step 315, the load analyzer 227 determines a probability distribution of a number of received queries were received by the cloud application instances 120 from the cloud clients 110.

At step 320, the load analyzer 227 determines from the historical data a probability distribution of a number of received queries completed by each of the one or more historical cloud application instances 120 during each of the one or more historical time periods. At step 325, optionally, the load analyzer 227 retrieves a penalty for under-provisioning cloud application instances 120 for each of the historical time periods. At step 330, optionally, the load analyzer 227 retrieves a cost for over-provisioning cloud application instances 120 for each of the historical time periods. At step 335, optionally, the load analyzer 227 retrieves constraints related to provisioning cloud application instances 120.

At step 340 the load analyzer 227 generates a provisioning plan for further time periods via application of a stochastic optimization model based upon, optionally, the number of historical cloud application instances executing during each of the one or more historical time periods, the probability distribution of the number of received queries during each of the one or more historical time periods, and the probability distribution of the number of received queries completed by each of the one or more cloud application instances. The load analyzer 227 may further base the new provisioning plan upon the penalty for under-provisioning cloud application instances 120 for each of the one or more historical time periods, the cost of overprovisioning cloud application instances 120 for each of the one or more historical time periods, and constraints related to provisioning. At step 345, the cloud application instance provisioner/deprovisioner 229 of the provisioner optimizer 130 replicates or removes cloud application instances 120 in accordance with the provisioning plan.

Figure 4:
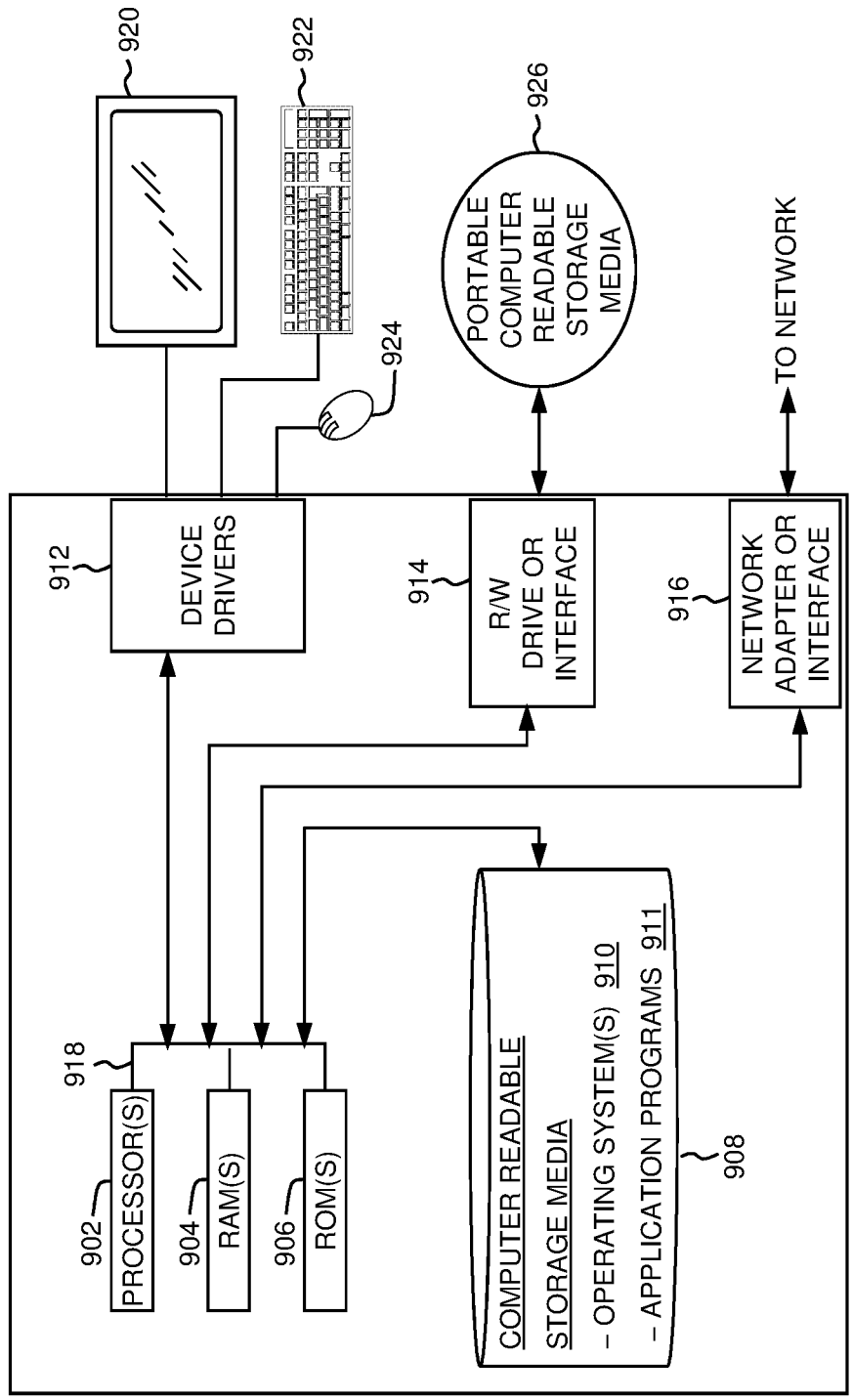
FIG. 4 depicts a block diagram of components of cloud client, cloud application instance, provisioner optimizer, and historical database of FIG. 1, in accordance with an embodiment of the present invention.

FIG. 4 depicts a block diagram of components of cloud client 110, cloud application instance 120, provisioner optimizer 130, and historical database 140 of the environment 100 for provisioner optimization in provision of cloud applications instances of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Cloud client 110, cloud application instance 120, provisioner optimizer 130, and historical database 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment for provisioner optimization in provision of cloud applications instances 100, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Cloud client 110, cloud application instance 120, provisioner optimizer 130, and historical database 140 may also include a R/W drive or interface 914 to read from and write to one or more portable computer readable storage media 926. Application programs 911 may be stored on one or more of the portable computer readable storage media 926, read via the respective R/W drive or interface 914 and loaded into the respective computer readable storage media 908.

Cloud client 110, cloud application instance 120, provisioner optimizer 130, and historical database 140 may also include a network adapter or interface 916, such as a TCP/IP adapter card or wireless communication adapter (such as a 4G wireless communication adapter using OFDMA technology). Application programs 911 on cloud client 110, cloud application instance 120, provisioner optimizer 130, and historical database 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Cloud client 110, cloud application instance 120, provisioner optimizer 130, and historical database 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
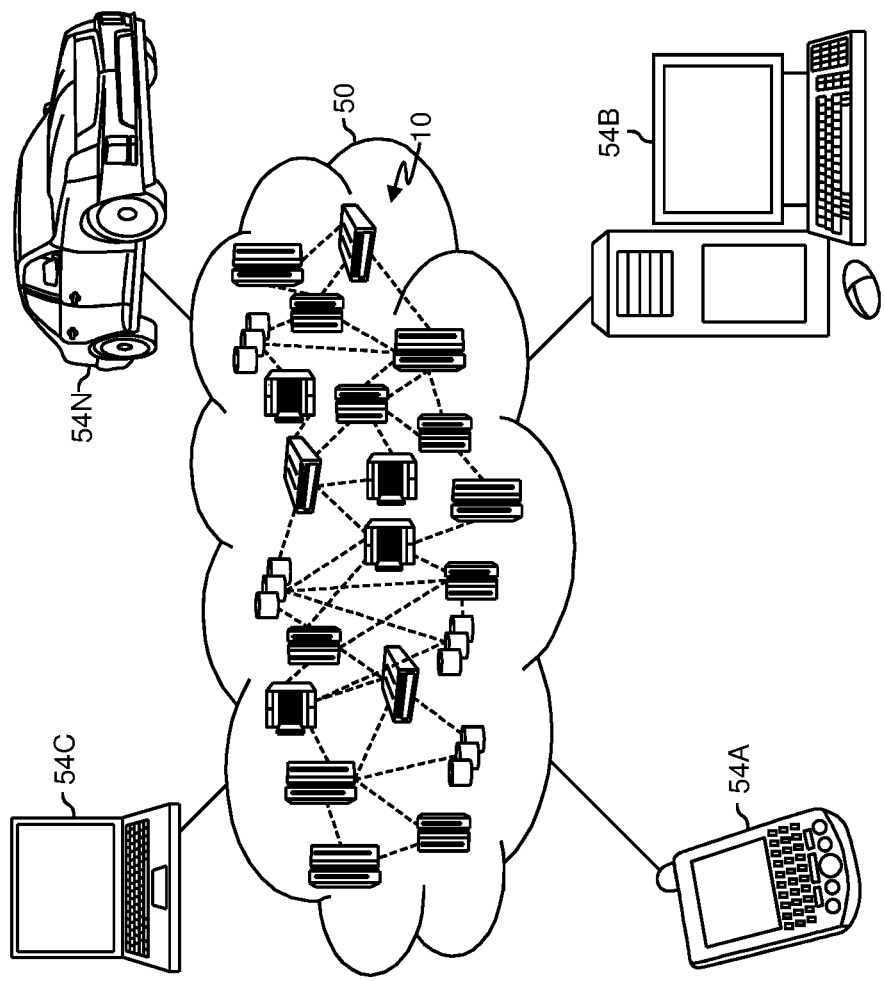
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
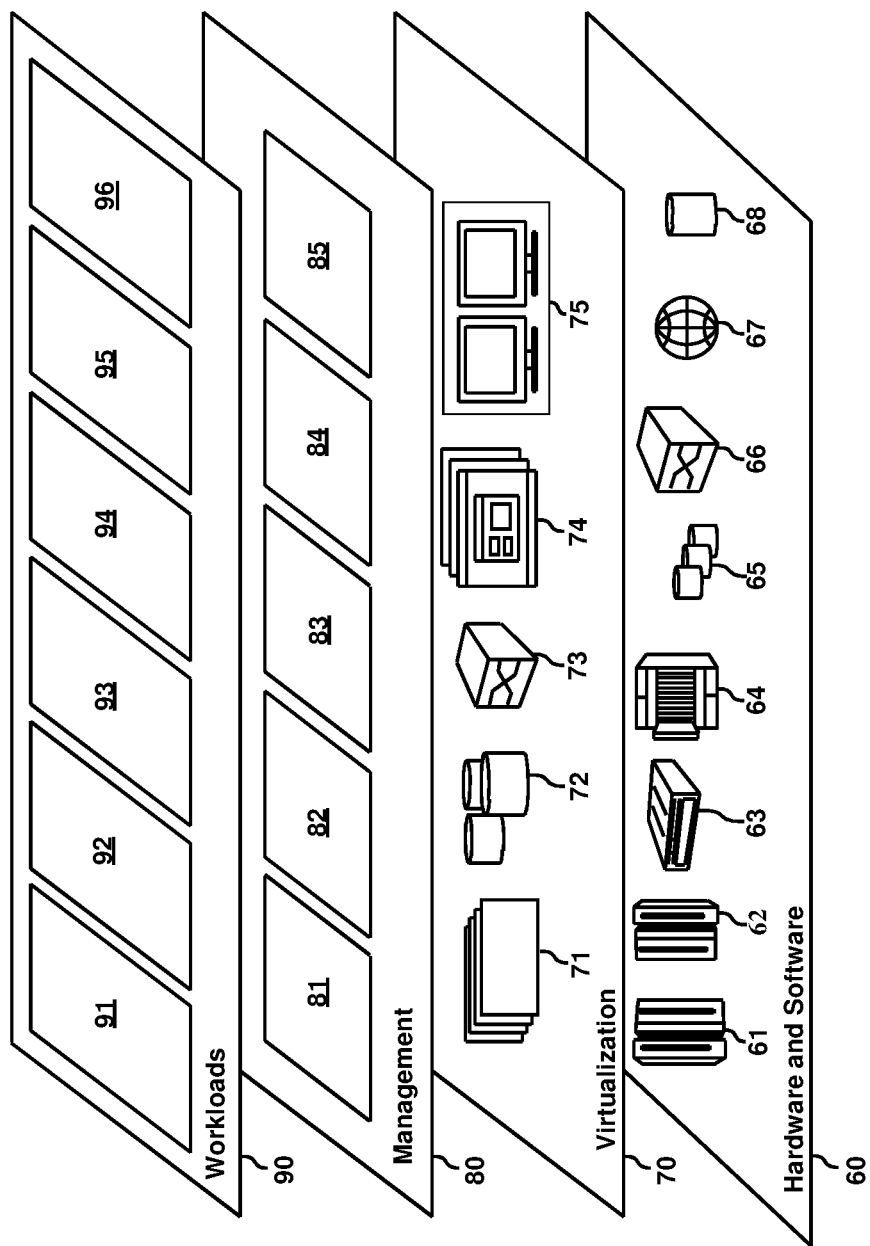
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method of provisioning and deprovisioning cloud application instances, the method comprising:
    Retrieving by a computing device historical data regarding one or more historical time periods during which a plurality of cloud application instances were provisioned;
    Determining by the computing device a probability distribution of a number of queries received by the historical cloud application instances during each of the one or more historical time periods;
    Determining by the computing device from the historical data a probability distribution of a number of received queries completed by each of the one or more historical cloud application instances during each of the one or more historical time periods;
    Generating by the computing device a new provisioning plan for future time periods via application of a stochastic optimization model based upon the probability distribution of the number of received queries during each of the one or more historical time periods, the probability distribution of the number of received queries completed by each of the one or more cloud application instances, and the new provisioning plan based upon the penalty for under-provisioning for each of the one or more historical time periods, the cost of over-provisioning for each of the one or more historical time periods, and constraints related to provisioning;
    Retrieving by the computing device a penalty for under-provisioning for each of the one or more historical time periods;
    Retrieving by the computing device a cost of over-provisioning for each of the one or more historical time periods; and
    Retrieving constraints related to provisioning cloud application instances.

2. The method of claim 1, wherein the computing device utilizes a datestamp and a timestamp of each received query to determine a number of received queries completed by each of the historical cloud application instances during each of the one or more historical time periods.

3. The method of claim 1, wherein one or more cloud application instances are replicated or removed in accordance with the new provisioning plan.

4. The method of claim 1, wherein the computing device continuously or periodically determines whether the new provisioning plan is necessary.

5. The method of claim 1, wherein the new provisioning plan is calculated individually for each future time period.

6. The method of claim 1, wherein the historical data regarding historical time periods during which the plurality of cloud application instances were executing includes an actual number of queries serviced by each of the plurality of cloud application instances during each of the one or more historical time periods.

7. The method of claim 1, wherein the provisioning plan for future time periods accounts for a variable number of queries received by each of the historical cloud application instances during each of the one or more historical time periods and a variable number of queries satisfied by each of the one or more historical cloud application instances during each of the one or more historical time periods.

8. A computer program product using a computing device to provision and deprovision cloud application instances, the computer program product comprising:

One or more non-transitory computer-readable storage media and program instructions stored on the one or more non-transitory computer-readable storage media, the program instructions, when executed by the computing device, cause the computing device to perform a method comprising:

Retrieving by the computing device historical data regarding one or more historical time periods during which a plurality of cloud application instances were provisioned;

Determining by the computing device a probability distribution of a number of queries received by the historical cloud application instances during each of the one or more historical time periods;

Determining by the computing device from the historical data a probability distribution of a number of received queries completed by each of the one or more historical cloud application instances during each of the one or more historical time periods;

Generating by the computing device a new provisioning plan for future time periods via application of a stochastic optimization model based upon the probability distribution of the number of received queries during each of the one or more historical time periods, the probability distribution of the number of received queries completed by each of the one or more cloud application instances, and the new provisioning plan based upon the penalty for under-provisioning for each of the one or more historical time periods, the cost of over-provisioning for each of the one or more historical time periods, and constraints related to provisioning;

Retrieving by the computing device a penalty for under-provisioning for each of the one or more historical time periods;

Retrieving by the computing device a cost of over-provisioning for each of the one or more historical time periods; and Retrieving constraints related to provisioning cloud application instances.

9. The computer program product of claim 8, wherein the computing device utilizes a datestamp and a timestamp of each received query to determine a number of received queries completed by each of the historical cloud application instances during each of the one or more historical time periods.

10. The computer program product of claim 8, wherein the one or more cloud application instances are replicated or removed in accordance with the new provisioning plan.

11. The computer program product of claim 8, wherein the computing device continuously or periodically determines whether the new provisioning plan is necessary.

12. The computer program product of claim 8, wherein the new provisioning plan is calculated individually for each future time period.

13. The computer program product of claim 8, wherein the historical data regarding historical time periods during which the plurality of cloud application instances were executing includes an actual number of queries serviced by each of the plurality of cloud application instances during each of the one or more historical time periods.

14. The computer program product of claim 8, wherein the provisioning plan for future time periods accounts for a variable number of queries received by each of the historical cloud application instances during each of the one or more historical time periods and a variable number of queries satisfied by each of the one or more historical cloud application instances during each of the one or more historical time periods.

15. A computer system for provisioning and deprovisioning of cloud application instances, the computer system comprising:

One or more computer processors;

One or more computer-readable storage media;

Program instructions stored on the computer-readable storage media for execution by at least one of the one or more processors, the program instructions comprising:

Program instructions to retrieve by a computer processor historical data regarding one or more historical time periods during which a plurality of cloud application instances were executing;

Program instructions to determine by the computer processor from the historical data a probability distribution of a number of queries received by the historical cloud application instances during each of the one or more historical time periods;

Program instructions to determine by the computer processor from the historical data a probability distribution of a number of received queries completed by each of the one or more historical cloud application instances during each of the one or more historical time periods;

Program instructions to generate by the computer processor a new provisioning plan for future time periods via application of a stochastic optimization model based upon the probability distribution of the number of received queries during each of the one or more historical time periods the probability distribution of the number of received queries completed by each of the one or more cloud application instances, and the new provisioning plan based upon the penalty for under-provisioning for each of the one or more historical time periods, the cost of over-provisioning for each of the one or more historical time periods, and constraints related to provisioning;

Program instructions to retrieve by the computer processor a penalty for under-provisioning for each of the one or more historical time periods;

Program instructions to retrieve by the computer processor a cost of over-provisioning for each of the one or more historical time periods; and Program instructions to retrieve constraints related to provisioning cloud application instances.

16. The computer system of claim 15, wherein the computer processor utilizes a datestamp and a timestamp of each received query to determine a number of received queries completed by each of the historical cloud application instances during each of the one or more historical time periods.

17. The computer system of claim 15, wherein one or more cloud application instances are replicated or removed in accordance with the new provisioning plan.

18. The computer system of claim 15, wherein the computer processor continuously or periodically determines whether the new provisioning plan is necessary.

19. The computer system of claim 15, wherein the new provisioning plan is calculated individually for each future time period.

20. The computer system of claim 15, wherein the historical data regarding historical time periods during which the plurality of cloud application instances were executing includes an actual number of queries serviced by each of the plurality of cloud application instances during each of the one or more historical time periods.

* * * * *